Feb. 18, 1936.  C. N. SONNENBURG  2,031,183
PATTY HOE
Filed June 21, 1935
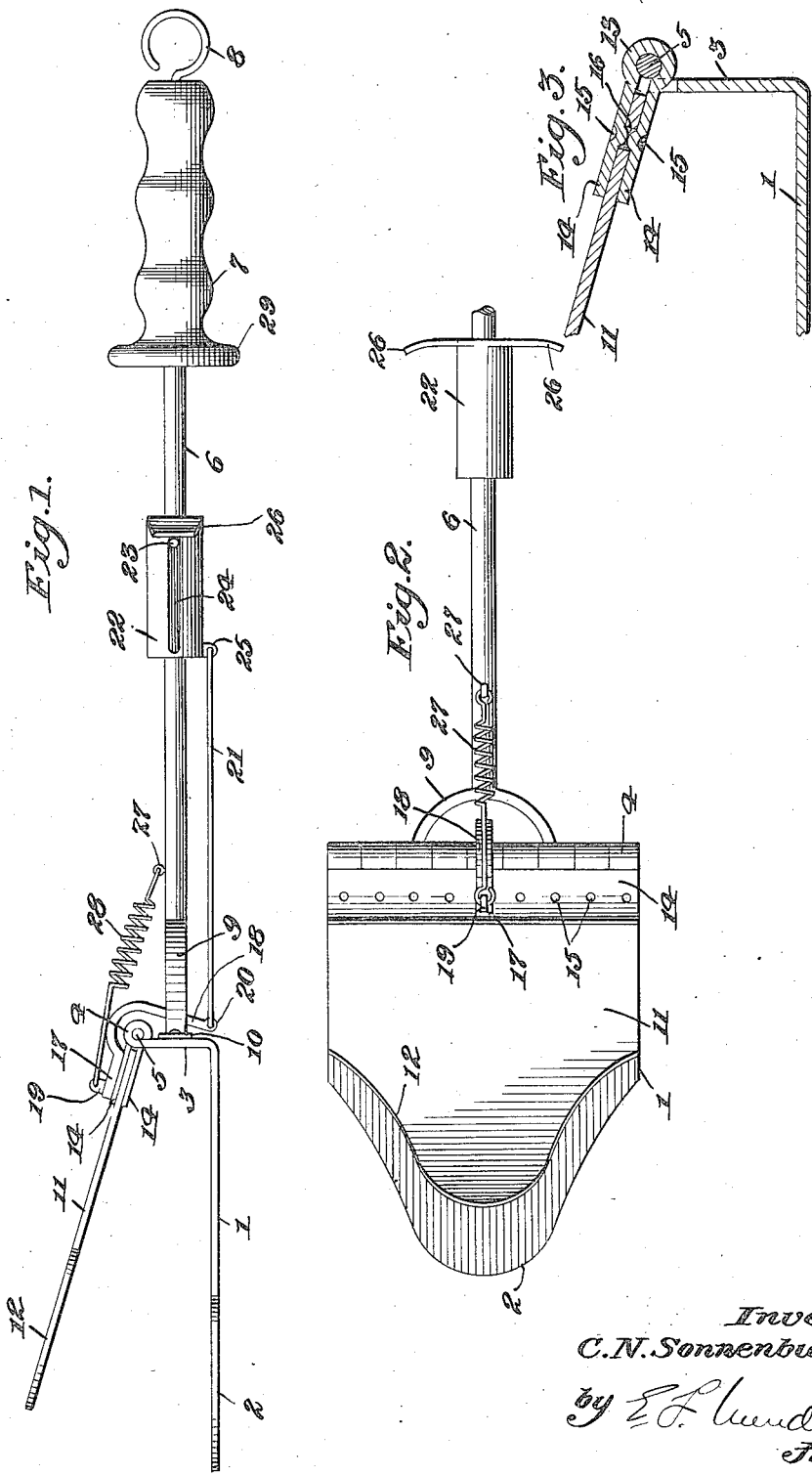
Inventor:
C. N. Sonnenburg, Patented Feb. 18, 1936

2,031,183

UNITED STATES PATENT OFFICE 2,031,183

PATTY-HOE

Clarence Nelson Sonnenburg, Baltimore, Md.

Application June 21, 1935, Serial No. 27,765

8 Claims. (Cl. 294—7)

My invention relates to a so-called patty-hoe, consisting of two spaced and superposed plates, and which can be used for handling fried eggs, flannel cakes, and the like, when used without the upper, removable one of the two plates; and for handling such things as meat cakes, crab cakes and similar articles requiring turning, when the upper plate is in position.

The device can be advantageously enlarged in size for the handling of breads, patty shells, pies and the like.

In its broadest aspects my patty-hoe comprises a flat plate to which is pivoted a second flat plate adapted to overlie the first one in spaced relation, so as to hold the delicate foodstuffs lightly but firmly in place. The pivoted plate is connected by means of a link to a sleeve slidable on a handle attached to the first plate, whereby the said second plate can be rocked about its hinge into and out of position over the articles undergoing handling. Preferably, the sleeve is provided with means for preventing its rotation, and preferably it has finger lugs or wings, which I term "wing-pulls", extending therefrom for gripping by the user. To prevent burning or injury to the hands of the user, the handle preferably terminates in a heat-insulating hand grip.

It is advantageous to provide a spring or the like interconnecting the handle and the pivotal plate, to rock the latter into its upward or open position upon release of the slidable sleeve by the user.

A desirable feature of my invention is the removable nature of the pivotally connected plate, which can be snapped at will out of the hinge which retains the same.

Each of the flat plates preferably has its front end shaped approximately in the manner of a curved, truncated triangle, the topmost or hinged plate preferably being slightly shorter than the bottom, fixed plate.

An object of my invention, therefore, is to produce an improved patty-hoe.

Another object is to provide a patty-hoe having a bottom flat plate and a spaced, top flat plate pivoted to the first plate and adapted to grip the food products lightly but firmly.

Another object is to produce a patty-hoe consisting of a flat plate having a handle portion, together with a second flat plate pivoted to and spaced from the first flat plate and adapted to be rocked by actuation of means slidable on the handle.

Yet another object is to provide a patty-hoe having a flat plate hinged to said first plate and adapted to overlie the same in spaced relation thereto, the said second flat plate being adapted to be removably secured in the hinge interconnecting the two plates.

Other objects and advantages will more fully appear hereinafter as the description of the drawing progresses.

One at present preferred form of my invention is shown merely by way of example in the attached drawing, wherein Figure 1 is a side elevation of a patty-hoe according to my invention;

Figure 2 is a top plan view thereof, part of the handle being omitted; and

Figure 3 is a longitudinal section, on enlarged scale, of the hinge detail.

The flat plate 1 has a front edge 2 shaped somewhat in the manner of a curved, truncated triangle. The rear end of the plate 1 is provided with an up-struck flange 3 having at its rear end a rearwardly offset rim 4 for the reception of a hinge pintle 5. An elongated handle 6 is provided, preferably having a heat insulating hand grip usually near the outer end thereof, made of material such as "bakelite" or other artificial resin; and an eye 8 whereby the patty-hoe can be hung out of the way when not in use. At its lower or inner end the handle 6 terminates in a yoke 9 having offset flange portions 10 whereby the handle is secured to the flange 3 of the plate 1.

A second flat plate 11 is hinged to the plate 1 in such manner as to rock relatively thereto through a vertical plane into a position wherein it overlies the plate 1 in spaced relation thereto. The plate 11 has a front edge 12 much similar to the edge 2 of the plate 1, but terminating short of the outer extremity of the said plate 1. The rims 13 of the second part of the hinge previously mentioned are shown in Figures 1 and 3 as terminating in double leaves 14 provided, as shown in Figures 2 and 3, with indentations or protuberances 15 adapted to be received in corresponding holes 16 provided along the inner transverse end of the plate 11. For convenience, I refer to these cooperating indentations or protuberances and holes simply by the collective term dimples. Because of this construction, it is readily possible to remove the plate 11 completely whenever desired, for cleaning, replacement, or other reasons.

As shown in Figures 1 and 2 there is secured in any desired manner to the upper leaf 14, an end 17 of a bent lever 18 which end preferably has mounted thereon a lug 19 or the like, for a purpose to be developed more fully hereinafter. At the end 20 of the said lever 18 is pivotally secured a link 21, which extends substantially parallel with the handle 6. As shown in Figures 1 and 2 a sleeve 22 is slidable axially along the handle 6 and is guided in its axial path and is prevented from turning by a suitable means such as a pin 23 formed on the handle 6, and which cooperates with an elongated slot 24 extending along the length of the sleeve 22. As shown, a lug 25 is struck up from that end of the sleeve 22 closest to the said flat plates, which lug pivotally receives the other end of the link 21. Preferably, the sleeve 22 is provided with wing pulls or lugs 26 projecting outwardly from the sleeve 22 near that end thereof which is adjacent the hand grip 7.

A screw 27 or the like, having an eye therein, is preferably seated in the handle 6, near that end thereof adjacent the said flat plates. A spring 28, preferably of the helical type, is shown as extending between the lug 19 and the screw or the like 27, and this serves, upon release of the wing pulls 26 by the user, to retract the flat plate 11 from its position overlying and parallel to the flat plate 1.

On the other hand, when the user desires to lightly grip an article of food by means of the upper plate 11 while the said article rests on the lower plate, he seizes the hand grip 7 by the second, third and fourth fingers, the enlarged abutment 29 of the handle 7 facilitating this operation, and seizes the wing pulls or lugs 26 with his thumb and index finger. Retraction of the sleeve 22 towards the handle (it being guided in a rectilinear path by the pin 23 and slot 24,) causes the pivot point 20 to move to the right, rocking the flat plate 11 downwardly, against the tension of the spring 28.

Now, if all that is desired is to fry eggs, bake flannel cakes, or handle simple flat articles, the upper plate 11 can be snapped quickly out from between the double leaves 14, so that the lower plate 1 can be used alone, being handled solely by the rod 6, serving as a rigid handle.

It will be readily understood that once the broad aspects of my invention are disclosed numerous adaptations and modifications will readily occur to those skilled in the art. Accordingly, I intend to be limited only by the scope of the appended claims.

I claim:

1. As a new article of manufacture, a patty-hoe, comprising an elongated flat plate with an upstruck flange at its rear end, an elongated handle attached to said flange for manipulation by the user, a second flat plate pivoted to the free end of said flange, and adapted to overlie said first plate in spaced relation thereto, a bent lever secured to the pivoted end of said second plate, a sleeve slidable on said handle, finger lugs projecting from said sleeve, and a link interconnecting said sleeve and said lever for swinging said second flat plate.

2. As a new article of manufacture, a patty-hoe, comprising an elongated flat plate with an upstruck flange at its rear end, an elongated handle attached to said flange for manipulation by the user, a second flat plate pivoted to the free end of said flange, and adapted to overlie said first plate in spaced relation thereto, a bent lever secured to the pivoted end of said second plate, a sleeve slidable on said handle, a pin in a selected one of said sleeve and handle, and a cooperating slot in the other of said two members, for guiding said sleeve in a rectilinear path and for preventing rotation thereof, and a link interconnecting said sleeve and said lever for swinging said second flat plate.

3. As a new article of manufacture, a patty-hoe, comprising an elongated flat plate with an upstruck flange at its rear end, an elongated handle attached to said flange for manipulation by the user, a hinge formed at the free end of said plate, a second plate secured to said hinge in such manner as to be quickly removable at will without disturbing the first plate, and adapted to overlie said first plate in spaced relation thereto, a bent lever secured to said hinge, a sleeve slidable on said handle, and a link interconnecting said sleeve and said lever for swinging said flat plate.

4. As a new article of manufacture, a patty-hoe, comprising an elongated flat plate, with an upstruck flange at its rear end, an elongated handle terminating in a yoke, said yoke being attached to said flange, for manipulation by the user, a second flat plate pivoted to the free end of said flange, and adapted to overlie said first plate in spaced relation thereto, a bent lever secured to the pivoted end of said second plate, a sleeve slidable on said handle, and a link interconnecting said sleeve and said lever for swinging said second flat plate.

5. As a new article of manufacture, a patty-hoe, comprising an elongated flat plate with an upstruck flange at its rear end, an elongated handle attached to said flange for manipulation by the user, a hinge formed at the free end of said plate, double leaves parallel to each other extending outwardly from said hinge and forming part thereof, a line of dimples extending along the inner surface of one of said leaves, a second flat plate having openings along one transverse edge for cooperation with and resilient engagement in said dimples, whereby the said second plate can be removably received in said hinge, said second plate being adapted to overlie said first plate in spaced relation thereto, a bent lever secured to one of said double leaves, a sleeve slidable on said handle, and a link interconnecting said sleeve and said lever for swinging said second flat plate.

6. As a new article of manufacture, a patty-hoe, comprising an elongated flat plate with an upstruck flange at its rear end, an elongated handle attached to said flange for manipulation by the user, a hinge formed at the free end of said plate, double leaves parallel to each other extending outwardly from said hinge and forming part thereof, a line of dimples extending along the inner surface of both of said leaves, a second flat plate having openings along one transverse edge for cooperation with and resilient engagement in said dimples, whereby the said second plate can be removably received in said hinge, said second plate being adapted to overlie said first plate in spaced relation thereto, a bent lever secured to one of said double leaves, a sleeve slidable on said handle, and a link interconnecting said sleeve and said lever for swinging said second flat plate.

7. As part of a patty-hoe having two flat plates, one being adapted to swing into overlying spaced relation with respect to the other, and having a row of openings along one transverse edge thereof; comprising hinge rims formed on the edge of one plate, double leaves parallel to each other forming at their juncture additional rims alternating in alignment with said first rims, a hingle pintle extending through said rims, and a line of indentations or projections formed along the inner surface of one of said leaves, to cooperate with the openings of said swingable plate, to resiliently and removably grip said plate between said leaves.

8. As part of a patty-hoe having two flat plates, one being adapted to swing into overlying spaced relation with respect to the other, and having a row of openings along one transverse edge thereof; comprising hinge rims formed on the edge of one plate, double leaves parallel to each other forming at their juncture additional rims alternating in alignment with said first rims, a hinge pintle extending through said rims, and a line of indentations or projections formed along the inner surface of both of said leaves, to cooperate with the openings of said swingable plate, to resiliently and removably grip said plate between said leaves.

CLARENCE NELSON SONNENBURG.